(12) United States Patent  (10) Patent No.: US 8,533,753 B2
Briggs et al.  (45) Date of Patent: Sep. 10, 2013

(54) INTERACTIVE PRODUCT PLACEMENT SYSTEM AND METHOD THEREFOR

(75) Inventors: Christian Briggs, Newport Coast, CA (US); Heath McBurnett, Aliso Viejo, CA (US); Delfino Galindo, Jr., Laguna Niguel, CA (US); Freddy Knuth, Euless, TX (US)

(73) Assignee: Cinsay, Inc., Dallas, TX (US)

( * ) Notice: Subject to any disclaimer, the term of this patent is extended or adjusted under 35 U.S.C. 154(b) by 0 days.

(21) Appl. No.: 13/605,892

(22) Filed: Sep. 6, 2012

(65) Prior Publication Data

US 2013/0061262 A1  Mar. 7, 2013

Related U.S. Application Data

(63) Continuation of application No. 12/363,713, filed on Jan. 30, 2009, now Pat. No. 8,312,486.

(51) Int. Cl.
*H04N 7/025* (2006.01)

(52) U.S. Cl.
USPC ............................................................ 725/32

(58) Field of Classification Search
USPC ............................................................ 725/32
See application file for complete search history.

(56) References Cited

U.S. PATENT DOCUMENTS

| | | | |
|---|---|---|---|
| 2007/0157228 A1* | 7/2007 | Bayer et al. ..................... | 725/34 |
| 2007/0266399 A1* | 11/2007 | Sidi ................................ | 725/42 |
| 2007/0300280 A1* | 12/2007 | Turner et al. .................. | 725/135 |
| 2008/0250445 A1* | 10/2008 | Zigmond et al. ............... | 725/32 |
| 2009/0083815 A1* | 3/2009 | McMaster et al. ............ | 725/110 |

* cited by examiner

*Primary Examiner* — Nicholas Corbo (57) ABSTRACT

A method for presenting advertisements for commercial products in video productions, whereby the commercial product is placed in the video production as an element of the video production. A viewer is enabled to interact with the video production to select the product. Information is then displayed about the selected product; and the viewer is enabled to purchase the selected product.

17 Claims, 5 Drawing Sheets

FIG. 6

INTERACTIVE PRODUCT PLACEMENT SYSTEM AND METHOD THEREFOR

CROSS-REFERENCE TO RELATED APPLICATIONS

This application is a continuation of U.S. patent application Ser. No. 12/363,713, filed Jan. 30, 2009, entitled now U.S. Pat. No. 8,312,486 "INTERACTIVE PRODUCT PLACEMENT SYSTEM AND METHOD THEREFOR." U.S. patent application Ser. No. 12/363,713 is assigned to the assignee of the present application and is incorporated by reference into this disclosure as if fully set forth herein. This disclosure hereby claims priority under 35 U.S.C. §120 to U.S. patent application Ser. No. 12/363,713.

TECHNICAL FIELD

The invention relates generally to interactive video broadcasting, and, more particularly, to placement of products in video broadcast for interactive purchase.

BACKGROUND

It is well-known that video may be broadcast or provided through a number of media, such as television, the Internet, DVD, and the like. To finance such video broadcast, commercial advertisements are often placed in the video. Commercials, however, require that the video be momentarily interrupted while the commercial is displayed. Not only is that annoying to viewers, but modern technology has developed digital video recorders (DVR's) that allow video programs to be pre-recorded, and when viewed, to fast-forward through commercials, thereby defeating the effectiveness and, hence, value of commercials. When commercials are de-valued, costs are not adequately covered, and as a result, broadcast service quality suffers. In many cases, costs are made up by charging viewers for the video service.

Therefore, what is needed is a system and method for advertising commercial products in such a way that they are not annoying and do not interrupt a video production, prompting a user fast-forward through them.

SUMMARY

The present invention, accordingly, provides a method for presenting advertisements for commercial products in video productions, whereby the commercial product is placed in the video production as an element of the video production. A viewer is enabled to interact with the video production to select the product. Information is displayed about the selected product; and the viewer is enabled to purchase the selected product.

More specifically, the invention comprises a web-based rich media software application allowing non-technical end-users the ability to easily create full frame interactive media overlays into the video production which has been encoded with pre-defined cue points that request immersive full motion video interactive overlay elements from an ad-server.

The cue points are utilized to trigger pre-defined advertising events stored and indexed with metadata in an ad server or other database. By way of example, an advertising event may include the extraction of a single video frame or a series of frames of the encoded video production, which in turn becomes the interactive advertisement that is triggered by the pre-set cue point and presented to the user as a seamless advertising/entertainment experience.

Once the cue point triggers an event, the system calls the specific advertisement into the video player and seamlessly overlays the initial video production with the enhanced interactive product ads. The ad is displayed for a predetermined life cycle, such as 5-10 seconds. Once the life cycle of the ad expires, or the ad is clicked or presented to the end user, the advertisement will destroy itself, leaving the viewer with the impression that there was never a break in the viewing experience.

In conjunction with the integrated overlay advertisements, the process of the invention is supplemented with an information and product integrated timeline residing under the video production. At the triggered cue point, watermarked icons/logos appear under the video production. Users can interact with the icons to garner more information about a particular character, location, or advertisers at a specific point in the feature presentation, employing the same aforementioned calls.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning the Internet, HTTP, XML, PHP, FLV, and the like have been omitted inasmuch as such details are not considered necessary to obtain a complete understanding of the present invention, and are considered to be within the skills of persons of ordinary skill in the relevant art.

It is noted that, unless indicated otherwise, all functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Figure 1:
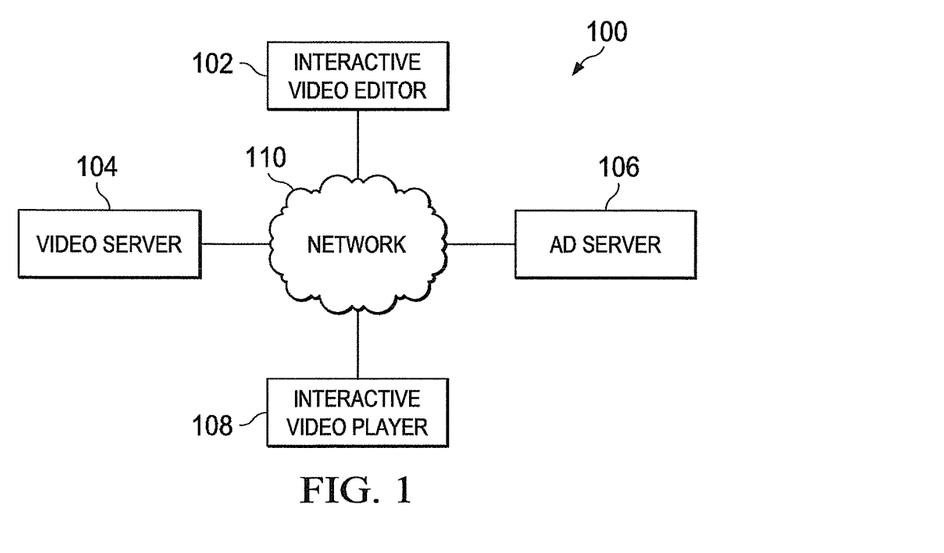
FIG. 1 is a high level block diagram of an interactive product placement system embodying features of the present invention.

Referring to FIG. 1 of the drawings, the reference numeral 100 generally designates an interactive product placement system embodying features of the present invention. The system 100 includes a video server 104 and an ad (i.e., "advertisement") server 106 coupled together via a communication information network effective for video streaming, such as the Internet, 110. An interactive video editor 102 is coupled via the Internet 110 to the video server 104 and ad server 106 for creating immersive interactive advertisements in conjunction with video productions displayed by the video server. An interactive video player 108 is coupled via the Internet 110 to the video server 104 and ad server 106 for displaying video productions from the video server 104 and ads from the ad server 106 in accordance with principles of the present invention.

Figure 3:
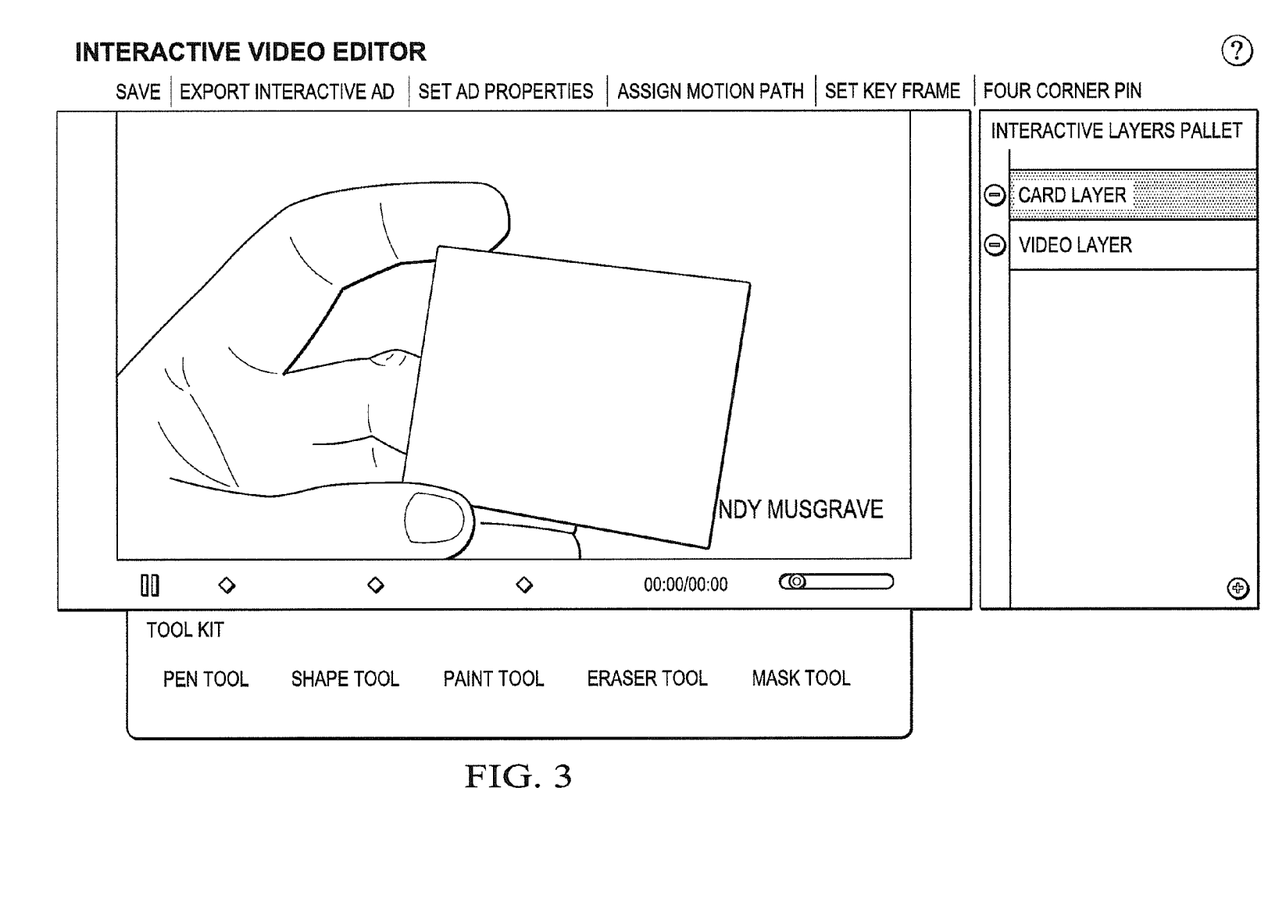
FIG. 3 exemplifies an application of an interactive video editor embodying features of the present invention.
Figure 4:
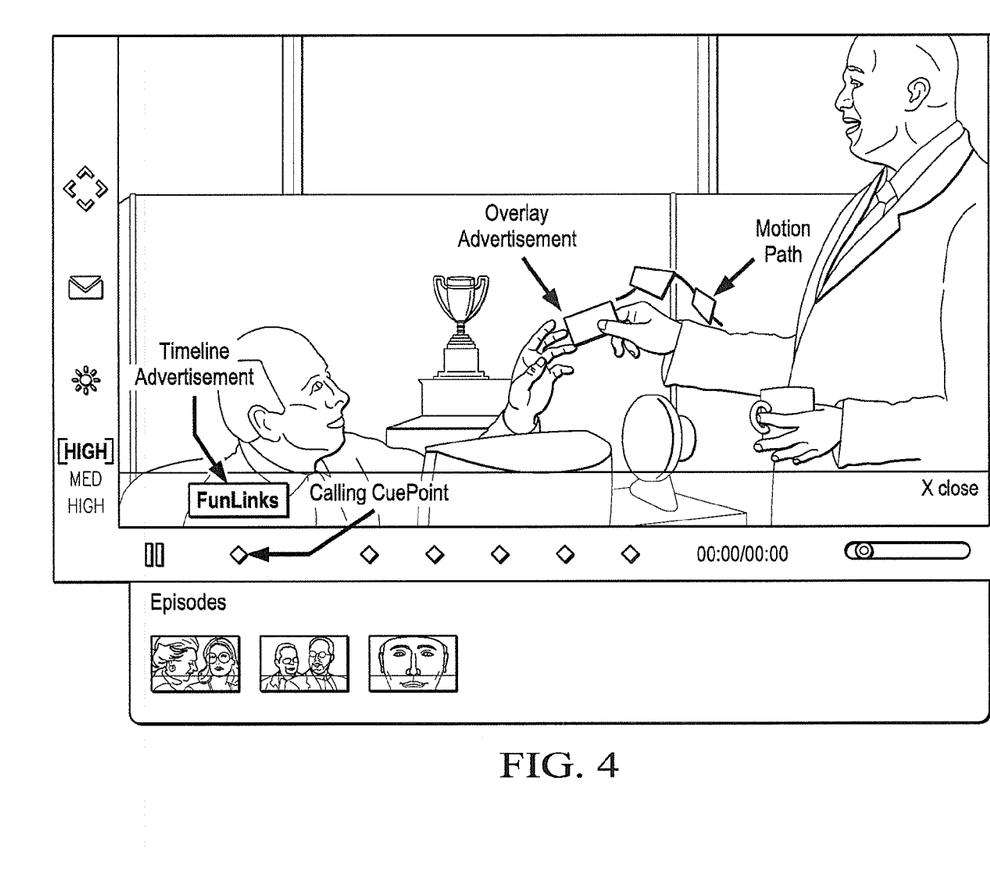
FIG. 4 exemplifies an application of an interactive video player embodying features of the present invention.

FIG. 3 exemplifies an application of the interactive video editor 102 for enabling non-technical ad representatives to create an immersive interactive advertising experience for users. The editor 102 defines the properties, interactive elements, visuals, and motion of the ad element stored in metadata and XML format and packaged with the ad file. The editor 102 is a rich media application comprising tools, a user interface, and backend connections to the ad server 106. The following lists, by way of example and not limitation, some preferred features of the editor 102:

File: Open
Save: Save an iteration of video project file.
Export: Export in all applicable compiled final production ready formats.

cation of the interactive video editor 102. The player 108 is a rich media application comprising tools, a user interface, and backend connections to the ad server 106.

As shown in FIG. 4, the video player 108 advertises a card in an overlay as it moves along a motion path. Also shown are an ad icon/logo for the card in a Timeline under the video display, and under the ad icon/logo, a calling cue point corresponding to a respective icon/logo above it. Optionally, under the calling cue points are episodes of the video production being watched. While the timeline is shown positioned beneath the video production, it may be positioned along the top, left, or right margins of the video production.

Figure 2:
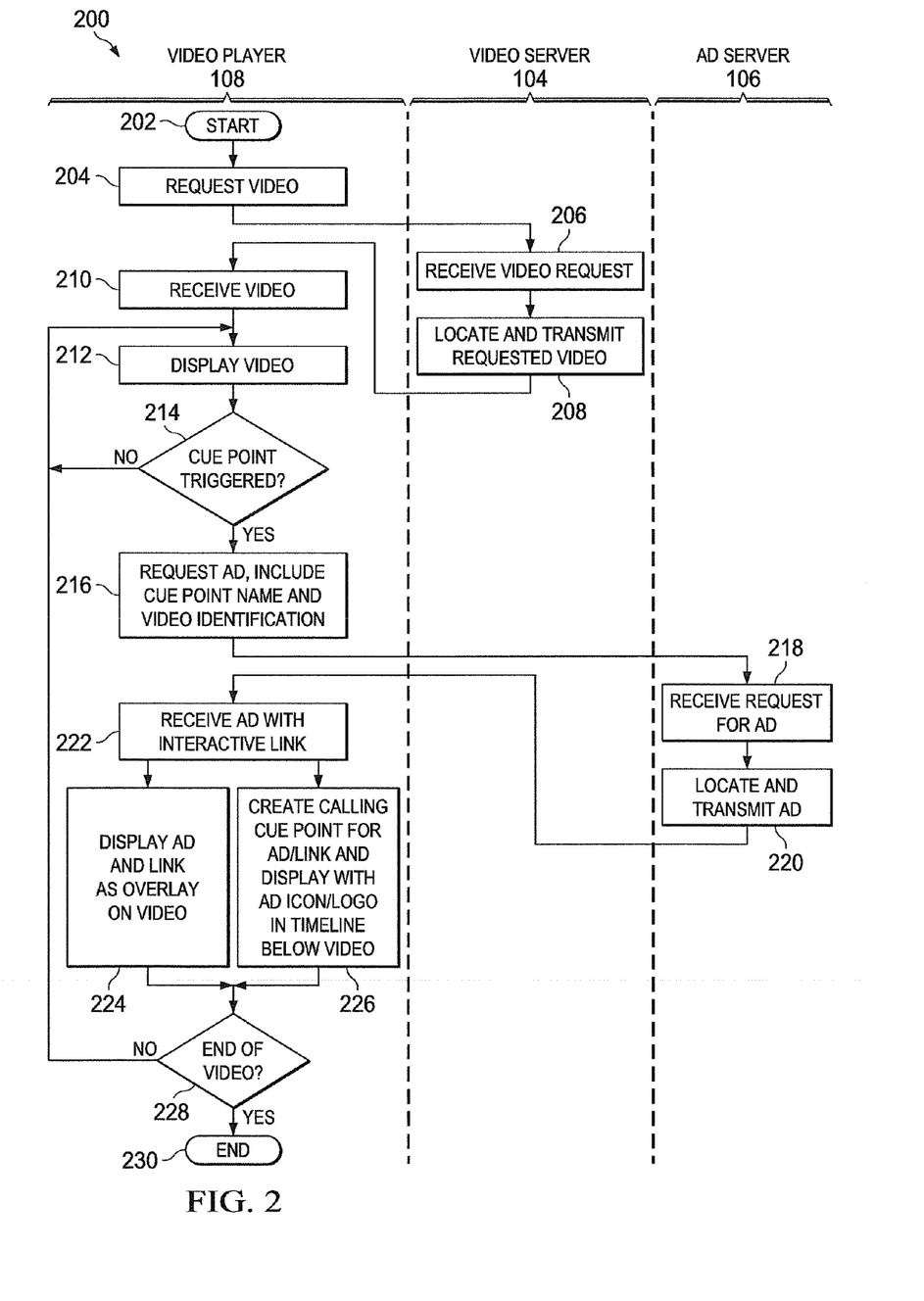
FIG. 2 exemplifies a flow chart illustrating control logic for implementing features of the system of FIG. 1.

FIG. 2 is a flow chart exemplifying steps in the operation of the invention. In step 202 operation begins, and in step 204 a request is generated by the video player 108 (per input from a user) for a video production and transmitted to the video server 104. In step 206, the video server 104 receives the request for a video production and, in step 208, the video server 104 locates the video production and transmits it to the video player 108. In step 212, the video player 108 begins playing the video production until a cue point is triggered in step 214. Upon triggering the cue point, execution proceeds to step 216 wherein the video player generates and transmits to the ad server 106 a request via HTTP POST requests for an ad, and includes with the request a cue point name and video ID into which the ad will be placed. The following exemplifies a request generated at step 216:

```
FLVPlayback.addEventListener(Video.CuePoint, function( ) {
    Var request = new
    URLRequest("filename.php?func=advertisment&movie_id="+movie_id+"&cue_point="
    + this.cuePointName);
}
```

Properties: Set campaign name, lifespan and essential metadata ad formats.
Assign Path: Create guideline to animate overlay object end to end over.
Set Key: Assign animation key frame.
Four Corner Pin: Pin vector points to set start and end frames over underlying video production. Corner Pin effect distorts an image by repositioning each of its four corners. Use it to stretch, shrink, skew, or twist an image or to simulate perspective or movement that pivots from the edge of a layer The interactive video editor 102 also enables layers to be added to the video production. More specifically, an overlay element allows users to see an underlying video preview. The first layer on the bottom forms a base layer, and anything layered on top of that at least partially obscures the layers underneath it.

Still further, the interactive video editor 102 includes a tool kit, comprising the following:
Pen: freeform drawing tool used to define shape
Shape: Set of predefined shapes to use as interactive element
Paint: Brush tool allowing more freeform element creation
Erase: Remove excess erase tool allows you to remove portions of shapes or lines with precision. You can change the size and shape of the eraser as well as the portions of any shape you want to erase by adjusting the options FIG. 4 exemplifies an application of the interactive video player 108 configured with the capabilities to read, display, and interact with code supplied by the corresponding appli- In step 218, the ad server 106 receives the ad request and, in step 220, the ad server 106 locates the requested ad and transmits the ad to the video player 108. The ad requests are made form the player application via HTTP POST requests. The response from the ad server or other database will be a small XML that gives the path of the ad, length, and any other information that's related to the ad. The player reacts to events signaled by the cue points request and will execute actions defined inside the event trigger instructing the player with the ad parameters, e.g., kind of ad file requested, the action to take, e.g., pause, lifespan, effect, specifics coordinates of the over-laid ad, and the like, as well as any other custom defined configurations.

The following exemplifies simple cue point metadata, which is generated by the video editor 102 and stored with the advertisement:

| TIME | CUE POINT NAME | ACTION | DURATION | URL PATH |
| --- | --- | --- | --- | --- |
| 1:54.02 | soda_can | Fade In | 10 sec. | http://yoururl.com/ad |
| 2:02.06 | pizza_box | Motion Path | 10 sec. | http://yoururl.com/ad |
| 9:02.04 | sneakers | Glow | 5 sec. | http://yoururl.com/ad |

In step 222, the video player receives the ad with an interactive link which a user/viewer may select and click on to obtain further information about the product being advertised, and optionally purchase same. The ad is then displayed as either or both an ad with the link as an overlay on the video production in step 224, or in step 226 as a calling cue point for the ad and link in an icon or logo in a timeline below the video production. In step 224, the ad is displayed for the duration indicated in the cue point data, as exemplified above. The icon or logo in the timeline of step 226 may remain in the timeline as long as space permits, that is, until space is needed for a icon or logo of a subsequent icon or logo.

In step 228, a determination is made whether the video production is complete. If the video production is not complete, execution returns to step 212; otherwise, execution is terminated as step 230.

Figure 5:
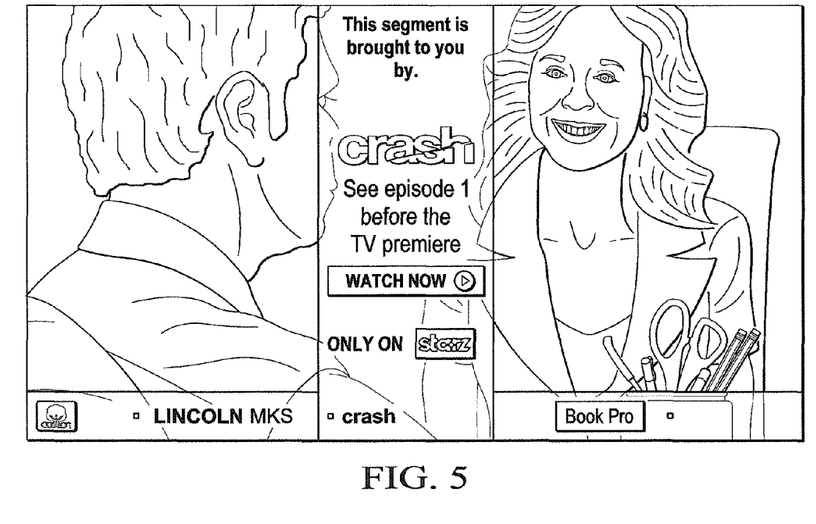
FIG. 5 exemplifies a product placement timeline embodying features of the present invention.
Figure 6:
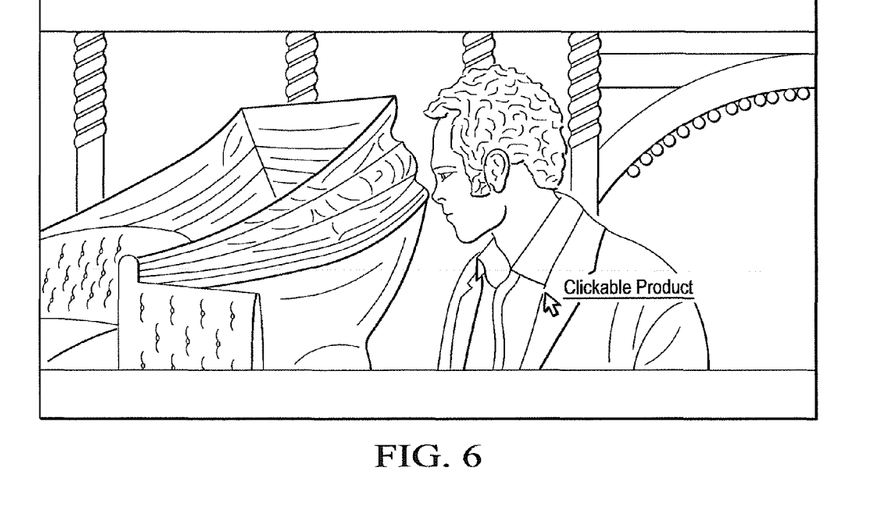
FIG. 6 exemplifies an interactive product placement embodying features of the present invention.

FIGS. 5 and 6 provide additional visual examples of interactive overlay and timeline ads, in which the video player 108 seeks cue points set in the video content triggering an ad event requesting either a timeline advertisement or an embedded live overlay advertisement. More specifically, FIG. 5 exemplifies how timeline information and advertisement offers directly correspond to cue points inside specific video content assets. FIG. 6 exemplifies how cue points trigger pre-defined advertising events stored and indexed with metadata in the ad server or other database. An example of the event may include the extraction of a single video frame or a series of frames of a video production, which in turn becomes the interactive advertisement that is laid over the video production to create a seamless interactive clickable video ad. As shown in FIG. 6, the product being advertised is highlight via rotoscoping, and additional information may be obtained about by clicking on the product.

By the use of the present invention, an improved method is provided for advertising products by interactively placing them either in a timeline or embedding them in a live overlay on a video production.

It is understood that the present invention may take many forms and embodiments. Accordingly, several variations may be made in the foregoing without departing from the spirit or the scope of the invention. For example, the compositing of elements otherwise non-existing into the finished advertising product or filming green screen products and services into the production to later composite via the video editing application. Means for interconnecting components of the system may be achieved other than via the Internet, such as via fiber optic or cable network or satellite. The video stream may be supplied by alternative means incorporating, for example, DVD technology.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for advertising in video productions, the method comprising:

transmitting, from one or more servers, a video production to a video player, the transmitted video production associated with at least one pre-defined cue point and containing one or more products or services;

transmitting an interactive advertising feature separate from the video production, from the one or more servers, the interactive advertising feature directly relating to the one or more products or services and including a selection enabled portion that allows a viewer of the video player to interactively retrieve further information about the one or more products or services;

wherein the video player is configured to display the video production;

wherein the video player is configured upon a triggering of the at least one pre-defined cue point to initiate the display of the interactive advertising feature, and wherein the interactive advertising feature is configured to allow a user to retrieve further information not previously displayed about the one or more products or services, at least some of the further information configured to be displayed as an overlay over the video production adjacent at least one edge of the displayable area of the video production without regard to a location or presence of the one or more products or services displayed within the video portion.

2. The method of claim 1, wherein the at least one pre-defined cue point represents a time at which the interactive advertising feature is to be displayed relative to a time of the video production being played.

3. The method of claim 1, wherein the at least some of the further information about the one or more products or the services is displayed as a transparent overlay.

4. The method of claim 1, wherein the interactive advertising feature is displayed in a timeline of the video located on a top, side, or bottom of the video player.

5. The method of claim 1, wherein the interactive advertising feature is at least one of text or graphics.

6. A system for advertising in video productions, the system comprising:

one or more servers configured to:

transmit a video production to a video player, the transmitted video production associated with at least one pre-defined cue point and containing one or more products or services;

transmit an interactive advertising feature separate from the video production, the interactive advertising feature:

directly relating to the one or more products or services, including a selection enabled portion that allows a viewer of the video player to interactively retrieve further information about the one or more products or services, and configured to allow a user to retrieve further information not previously displayed about the one or more products or services, at least some of the further information configured to be displayed as an overlay over the video production adjacent at least one edge of the displayable area of the video production without regard to a location or presence of the one or more products or services displayed within the video portion;

wherein the video player is configured to display the video production; and wherein the video player is configured upon a triggering of the at least one pre-defined cue point to initiate the display of the interactive advertising feature.

7. The system of claim 6, wherein the at least one pre-defined cue point represents a time at which the interactive advertising feature is to be displayed relative to a time of the video production being played.

8. The system of claim 7, wherein the at least some of the further information about the one or more products or the services is displayed as a transparent overlay.

9. The system of claim 6, wherein the interactive advertising feature is displayed in a timeline of the video located on a top, side, or bottom of the video player.

10. The system of claim 6, wherein the interactive advertising feature is at least one of text or graphics.

11. A video player for advertising a product or service in a video production, the video player configured to:
   receive, from one or more servers, a video production to a video player, a video production associated with at least one pre-defined cue point and containing one or more products or services;
   receive, from the one or more servers, an interactive advertising feature corresponding to the one or more products or services and including a selection enabled portion that allows a viewer of the video player to interactively retrieve further information about a product or service;
   display the video production; and
   initiate a display of the interactive advertising feature upon a triggering of the at least one pre-defined cue point; and
   wherein the interactive advertising feature is received separate from the video production and configured to allow a user to retrieve further information not previously displayed about the one or more products or services, at least some of the further information configured to be displayed as an overlay over the video production adjacent at least one edge of the displayable area of the video production without regard to a location or presence of the one or more products or services displayed within the video portion.

12. The video player of claim 11, wherein the at least one pre-defined cue point represents a time at which the interactive advertising feature is to be displayed relative to a time of the video production being played.

13. The video player of claim 12, wherein the interactive advertising feature is displayed in a timeline of the video located on a top, side, or bottom of the video player.

14. The video player of claim 11, wherein the interactive advertising feature is at least one of text or graphics.

15. The video player of claim 11, wherein the video player allows a user to select a format of the video production received from the one or more servers.

16. The method of claim 1, wherein the video player allows a user to select a format of the video production transmitted from the one or more servers.

17. The system of claim 6, wherein the video player allows a user to select a format of the video production transmitted from the one or more servers.

* * * * *

UNITED STATES PATENT AND TRADEMARK OFFICE
CERTIFICATE OF CORRECTION

PATENT NO.        : 8,533,753 B2                                      Page 1 of 1
APPLICATION NO.   : 13/605892
DATED             : September 10, 2013
INVENTOR(S)       : Christian Briggs et al.

It is certified that error appears in the above-identified patent and that said Letters Patent is hereby corrected as shown below:

In the Claims
Column 6, Claim 1, line 11, delete "initiate the" and insert --initiate a--.
Column 6, Claim 1, line 18, delete "the displayable area" and insert --a displayable area--.
Column 6, Claim 1, line 21, delete "video portion" and insert --video production--.
Column 6, Claim 4, line 30, delete "video" and insert --video production--.
Column 6, Claim 6, line 52, delete "edge of the" and insert --edge of a--.
Column 6, Claim 6, lines 55-56, delete "video por-tion" and insert --video production--.
Column 6, Claim 6, line 60, delete "initiate the" and insert --initiate a--.
Column 7, Claim 9, line 5, delete "video" and insert --video production--.
Column 7, Claim 11, line 11, delete "to a" and insert --by the--.
Column 7, Claim 11, line 12, delete "a video" and insert --the video--.
Column 8, Claim 11, line 3, delete "the displayable area" and insert --a displayable area--.
Column 8, Claim 11, line 6, delete "video portion" and insert --video production--.
Column 8, Claim 13, line 12, delete "video" and insert --video production--.

Signed and Sealed this
Twenty-fifth Day of March, 2014

Michelle K. Lee
*Deputy Director of the United States Patent and Trademark Office*